(12) United States Patent
Partovi et al.

(10) Patent No.: US 7,447,299 B1
(45) Date of Patent: Nov. 4, 2008

(54) VOICE AND TELEPHONE KEYPAD BASED DATA ENTRY FOR INTERACTING WITH VOICE INFORMATION SERVICES

(75) Inventors: Hadi Partovi, San Francisco, CA (US); Roderick Steven Brathwaite, Livermore, CA (US); David Bryan Alpert, Mountain View, CA (US); Jeremy Belldina, Burlingame, CA (US); Barry Arons, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 651 days.

(21) Appl. No.: 09/621,715

(22) Filed: Jul. 24, 2000

Related U.S. Application Data

(60) Provisional application No. 60/201,328, filed on May 2, 2000.

(51) Int. Cl.
  *H04M 1/64* (2006.01)
(52) U.S. Cl. .................................. 379/88.01; 379/93.18
(58) Field of Classification Search .............. 379/88.01, 379/93.18, 93.01, 88.16, 88.24
  See application file for complete search history.

(56) References Cited

U.S. PATENT DOCUMENTS

| | | | | |
|---|---|---|---|---|
| 4,608,460 A | * | 8/1986 | Carter et al. .................. 379/71 |
| 4,979,206 A | * | 12/1990 | Padden et al. ............. 379/88.01 |
| 5,031,206 A | * | 7/1991 | Riskin ...................... 379/93.27 |
| 5,131,045 A | * | 7/1992 | Roth ........................... 704/237 |
| 5,255,310 A | * | 10/1993 | Kim et al. ................. 379/88.01 |
| 5,479,489 A | * | 12/1995 | O'Brien .................... 379/88.03 |
| 5,638,425 A | * | 6/1997 | Meador et al. ............ 379/88.01 |
| 5,890,123 A | | 3/1999 | Brown et al. |
| 5,917,889 A | * | 6/1999 | Brotman et al. ........... 379/88.01 |
| 5,952,942 A | * | 9/1999 | Balakrishnan et al. ......... 341/20 |
| 5,987,414 A | * | 11/1999 | Sabourin et al. ............. 704/270 |
| 6,052,443 A | * | 4/2000 | Perera et al. .............. 379/93.18 |
| 6,236,967 B1 | * | 5/2001 | Brotman et al. ............. 704/270 |
| 6,421,672 B1 | * | 7/2002 | McAllister et al. ............ 707/10 |
| 6,728,348 B2 | * | 4/2004 | Denenberg et al. ........ 379/93.18 |

\* cited by examiner

*Primary Examiner*—Olisa Anwah
(74) *Attorney, Agent, or Firm*—Perkins Coie LLP

(57) ABSTRACT

This invention relates in general to methods for receiving and interpreting an alphanumeric input string entered on a telephone keypad using one keystroke per input string character. The set of matching objects in a database are selected and sorted and presented to the user as an ordered list from which the user may select the desired item on the list through a further numeric keystroke entry or through a spoken selection that is matched against a restricted voice recognition grammar for improved recognition accuracy. In an alternative embodiment, the matching objects in the database are selected and sorted and the response associated with each matched object is presented in sorted sequence.

18 Claims, 3 Drawing Sheets

VOICE AND TELEPHONE KEYPAD BASED DATA ENTRY FOR INTERACTING WITH VOICE INFORMATION SERVICES

REFERENCE TO RELATED APPLICATION

This application claims priority under 35 U.S.C. § 119 from U.S. Provisional Application Ser. No. 60/201,328, filed on 2 May 2000, entitled "A Voice and Telephone Keypad Based Data Entry Method for Interacting with Voice Information Services", the disclosure of which is hereby incorporated herein by reference.

BACKGROUND OF THE INVENTION

1. Field of the Invention

This invention relates in general to methods for receiving an alphanumeric input string entered using a telephone keypad and for confirming the intended input string using voice prompts, and in particular to an identification method that permits the recognition and confirmation of input strings entered with one keystroke per input string character.

2. Description of the Related Art

Commercially available voice recognition hardware and software systems have become relatively sophisticated and can recognize words and phrases with a reasonably high degree of accuracy. Accordingly, such voice recognition systems have been used to implement voice user interfaces deployed in messaging systems, vehicles, computers, telephony, and other applications. In such systems, similar sounding words may be difficult to distinguish, as may be words spoken in an unusual accent, and the like. Noise (e.g., line noise or noise originating at the sound source) and dropouts typical in telephonic applications can also adversely impact speech recognition accuracy. Accordingly, a telephone keypad type data input method can be a useful adjunct to a voice recognition system for noisy environments, for use in further distinguishing from among similar sounds, or for applications that are to be made available to a broad user base having disparate accents or dialects.

Currently, most touch tone (i.e., dual-tone multi-frequency code or DTMF code) data entry systems utilize a two-keystroke-per-alphanumeric-character text input system, due to the fact that standard telephone keypads do not assign a unique key to each alphanumeric character but instead assign several alphanumeric characters to each individual key. Typically, the first key in each two-key sequence is used to identify a distinct character set, and the second key is used to identify specific character within the set. For example, a telephone query to a stock quote system might require an entry of a sequence such as 6, 1, 7, 3, 3, 3, 8, 1 to input a ticker symbol such as MSFT (i.e., M=<6,1>S=<7,3>, F=<3,3>, T=<8,1>). While such an entry method is accurate, it is slow, cumbersome, potentially confusing, and difficult to learn.

Conversely, if a single key per character input method is employed in an application to enter alphanumeric information, the resultant input sequence may not contain sufficient information to precisely and uniquely determine the specific alphanumeric string intended, and therefore the number of potentially correct responses can be quite large and therefore difficult to present to the user in a readily useful manner.

SUMMARY OF THE INVENTION

Figure 1:
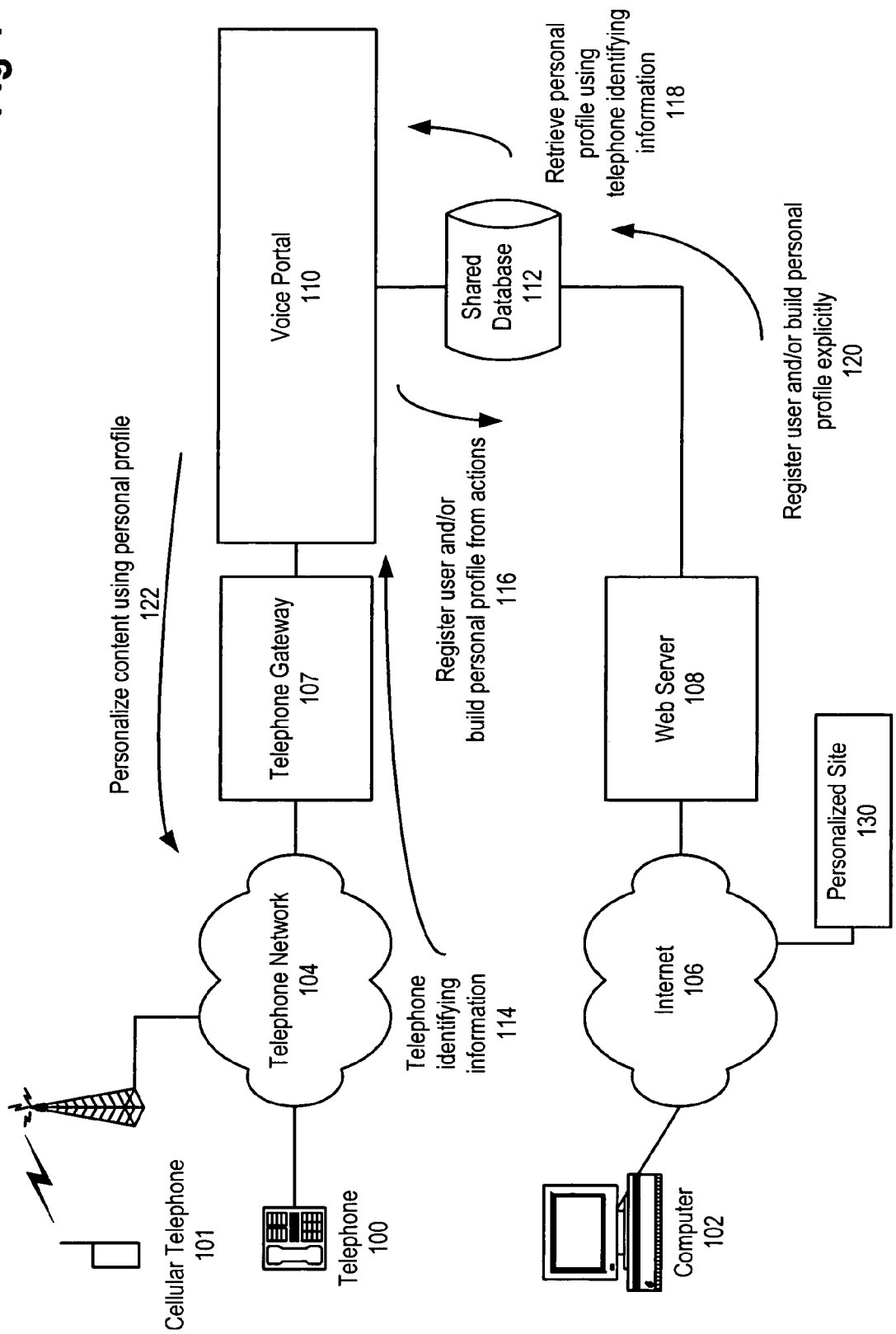
FIG. 1 illustrates a system including embodiments of the invention used to provide personalized content to users of telephones according to telephone identifying information.

A method for retrieving, ordering, presenting and confirming data retrieved in response to user input entered using one keystroke per input string character is described. In one embodiment, a telephone keypad may be used to enter the input data, which input data is used to select a set of potentially matching results. The results are ordered by a weighting factor, which can for example be based on popularity, historical usage statistics, or other criteria, and then the results are presented verbally over the telephone as an ordered list. The user can then either use a further keystroke to uniquely identify the number of the item on the ordered list, or alternatively, the user can speak the number of the desired item.

DETAILED DESCRIPTION

Introduction

A method of recognizing and confirming information entered via a keypad in a voice recognition application is described. The method is presented in the context of a voice portal for presenting personalized content over a telephone interface, but it should be recognized that the method is more generally applicable to telephone keypad type data entry systems used in conjunction with a voice application. The described voice portal allows users of telephones, including cellular telephones, to access a voice portal by dialing a phone number to listen to personalized content. The information provided over the voice portal may come from the World Wide Web (WWW), databases, third parties, and/or other sources.

The term voice portal refers to the capability of various embodiments of the invention to provide customized voice and/or audio content services to a caller. The voice portal can recognize dual-tone multi-frequency ("DTMF") touch-tone commands as well as spoken commands to further control the voice and/or audio content presented and the manner of presentation.

Embodiments of the invention use telephone identifying information to personalize caller interactions with the voice portal. This allows the system to present highly customized information to each caller based on a personal profile the system associates with the telephone identifying information.

The invention will be described in greater detail as follows. First, a number of definitions useful to understanding the invention are presented. Then, the hardware and software architecture is presented in the System Overview. Then, a following section describes the keypad entry features provided by embodiments of the invention.

DEFINITIONS

1. Telephone Identifying Information

For the purposes of this application, the term telephone identifying information will be used to refer to automatic number identification ("ANI") information, caller identification ("CID") information, and/or some other technique for automatically identifying the source of a call and/or other call setup information. For example, ANI information typically includes a dialed number identification service ("DNIS"). Similarly, CID information may include text data including the subscriber's name and/or address, e.g., "Jane Doe". Other examples of telephone identifying information might include the type of calling phone, e.g. cellular, pay phone, and/or hospital phone.

Additionally, the telephone identifying information may include wireless carrier specific identifying information, e.g., location of wireless phone, etc. Also, signaling system seven ("SS7") information may be included in the telephone identifying information.

2. User Profile

A user profile is a collection of information about a particular user. The user profile typically includes collections of different information of relevance to the user, e.g., account number, name, contact information, user-id, default preferences, and the like. Notably, the user profile contains a combination of explicitly made selections and implicitly made selections.

Explicitly made selections in the user profile stem from requests by the user to the system. For example, the user might add business news to the main topic list. Typically, explicit selections come in the form of a voice, or touch-tone command, to save a particular location, e.g., "Remember this", "Bookmark it", "shortcut this", pound (#) key touch-tone, etc., or through adjustments to the user profile made through a web interface using a computer.

In contrast, implicit selections come about through the conduct and behavior of the user. For example, if the user repeatedly asks for the weather in Palo Alto, Calif., the system may automatically provide the Palo Alto weather report without further prompting. In other embodiments, the user may be prompted to confirm the system's implicit choice, e.g., the system might prompt the user "Would you like to include Palo Alto in the standard weather report from now on?"

Additionally, the system may allow the user to customize the system to meet her/his needs better. For example, the user may be allowed to control the verbosity of prompts, the dialect used, and/or other settings for the system. These customizations can be made either explicitly or implicitly. For example if the user is providing commands before most prompts are finished, the system could recognize that a less verbose set of prompts is needed and implicitly set the user's prompting preference to briefer prompts.

3. Topics and Content

A topic is any collection of similar content. Topics may be arranged hierarchically. For example, a topic might be business news, while subtopics might include stock quotes, market report, and analyst reports. Within a topic different types of content are available. For example, in the stock quotes subtopic, the content might include stock market index quotes. The distinction between topics and the content within the topics is primarily one of degree in that each topic, or subtopic, will usually contain several pieces of content.

4. Qualified

The term qualified as it is used in this application refers to whether or not a particular user being presented an advertisement, or other material, meets the demographic and/or psychographic profile requirements for that advertisement, or content. For example, a San Francisco-based bookstore might request that all listeners to its advertisement be located in a particular part of the San Francisco Bay Area. Thus, a user of the system would be qualified if she lived in the designated part of the San Francisco Bay Area.

Different embodiments of the invention may qualify users of the system according to different requirements. For example, in some instances advertising, or content, is qualified solely based on telephone identifying information. In other embodiments the telephone identifying information is used in conjunction with other information such as an associated user profile, a reverse telephone number lookup for locale demographics, and/or other information.

5. Locale

As used in this application, the term locale refers to any geographic area. The geographic area may be a neighborhood, a city, a county, a metropolitan region, a state, a country, a continent, a group of countries, and/or some other collection of one or more geographic areas, e.g. all United State major metropolitan areas.

For this reason, a single user of the system may be considered to be in several locales. For example, a caller from Palo Alto, Calif., might be in the Palo Alto locale, a Silicon Valley locale, a San Francisco Bay Area locale, a Northern California locale, a California state locale, a western states locale, and a United States locale.

Thus, the telephone identifying information for a single telephone number can be mapped to a number of system-defined locales.

6. Voice Character

The term voice character as it is used in this application refers to all aspects of speech pronunciation including dialect, speed, volume, gender of speaker, pitch, language, voice talent used, actor, characteristics of speech, and/or other prosody values. Users can adjust the voice character of the system by changing their voice character settings.

For example, an elderly user could select voice character settings that provide louder volume and slower speech. Similarly, a caller from the South could adjust the voice character settings to support a Southern dialect.

7. Demographic and Psychographic Profiles

Both demographic profiles and psychographic profiles contain information relating to a user. Demographic profiles typically include factual information, e.g., age, gender, marital status, income, etc. Psychographic profiles typically include information about behaviors, e.g., fun loving, analytical, compassionate, fast reader, slow reader, etc. As used in this application, the term demographic profile will be used to refer to both demographic and psychographic profiles.

System Overview

First, the hardware and software architecture of a system including an embodiment of the invention will be described with reference to FIGS. 1-2. FIG. 1 illustrates a system including embodiments of the invention used to provide personalized content to users of telephones according to telephone identifying information. The system of FIG. 1 can be used to allow users of standard telephones and cellular telephones to access a voice portal with personalized content from their telephones.

The following lists the elements of FIG. 1 and describes their interconnections. FIG. 1 includes a telephone 100, a cellular telephone 101, a computer 102, a telephone network 104, an Internet 106, a telephone gateway 107, a web server 108, a voice portal 110, a shared database 112, and a personalized site 130. The cellular telephone 101 and the telephone 100 are coupled in communication with the telephone network 104. The telephone network 104 is coupled in communication with the telephone gateway 107. The telephone gateway 107 is coupled in communication with the voice portal 110. The computer 102 is coupled in communication with the Internet 106. The Internet 106 is coupled in communication with the web server 108. The voice portal 110 and the web server 108 are coupled in communication with the shared database 112. The personalized site 130 is coupled in communication with the Internet 106.

The following describes each of the elements of FIG. 1 in greater detail. The use of each of the elements will be described further in conjunction with the sections describing the personalization features.

The telephone 100 and the cellular telephone 101 are two different telephone interfaces to the voice portal 110. The telephone 100 and the cellular telephone 101 may be any sort of telephone and/or cellular telephone. For example, the telephone 100 or the cellular telephone 101 may be a land line phone, a PBX telephone, a satellite phone, a wireless telephone, and/or any other type of communication device capable of providing voice communication and/or touch-tone signals over the telephone network 104. However, any audio signal carrying interface could be used.

The telephone network 104 may be the public switched telephone network ("PSTN") and/or some other type of telephone network. For example, some embodiments of the invention may allow users with a voice over Internet Protocol ("IP") phone to access the voice portal 110. The telephone network 104 is coupled to the telephone gateway 107 that allows the voice communications and/or touch-tone signals from the telephone network 104 to reach the voice portal 110 in usable form. Similarly, the telephone gateway 107 allows audio signals generated by the voice portal 110 to be sent over the telephone network 104 to respective telephones, e.g. the telephone 100. The telephone network 104 generally represents an audio signal carrying network.

The computer 102 is a computer such as a personal computer, a thin client computer, a server computer, a handheld computer, a set top box computer, and/or some other type of visual web browsing device. The computer 102 is coupled in communication with the Internet 106, e.g., by a dial-up connection, a digital subscriber loop (DSL), a cable modem, and/or some other type of connection. This allows the computer 102 to communicate with the web server 108. The computer 102 typically provides a visual interface to the WWW and the web server 108 using web browsing software such as the Internet Explorer™ browser from Microsoft Corporation, Redmond, Wash.

Both the web server 108 and the voice portal 110 are capable of communicating with the shared database 112 to register users, build personal profiles implicitly and/or explicitly as will be described more fully below. The database 112 stores profiles for each user based on an association between one or more pieces of telephone identifying information and a particular user. Thus, the database may have a profile for a user Sarah Smith that is keyed to her home telephone number, e.g., 650-493-####. Additionally, Sarah could associate other numbers, e.g., work, cellular, etc., with her profile either implicitly, e.g., by repeatedly calling the voice portal 110 from those numbers, or explicitly, e.g., by adding those numbers to the system directly.

In some embodiments, an existing profile for a web-based portal is adapted for use by the voice portal 110 by associating one or more telephone numbers with the existing profile as stored in the shared database 112. In these embodiments, the existing profile may be further modified for use with the voice portal 110 to allow for different preferences between the web and the voice interfaces.

The call flow arrows 114-122 shown on FIG. 1 will be described in greater detail below.

Figure 2:
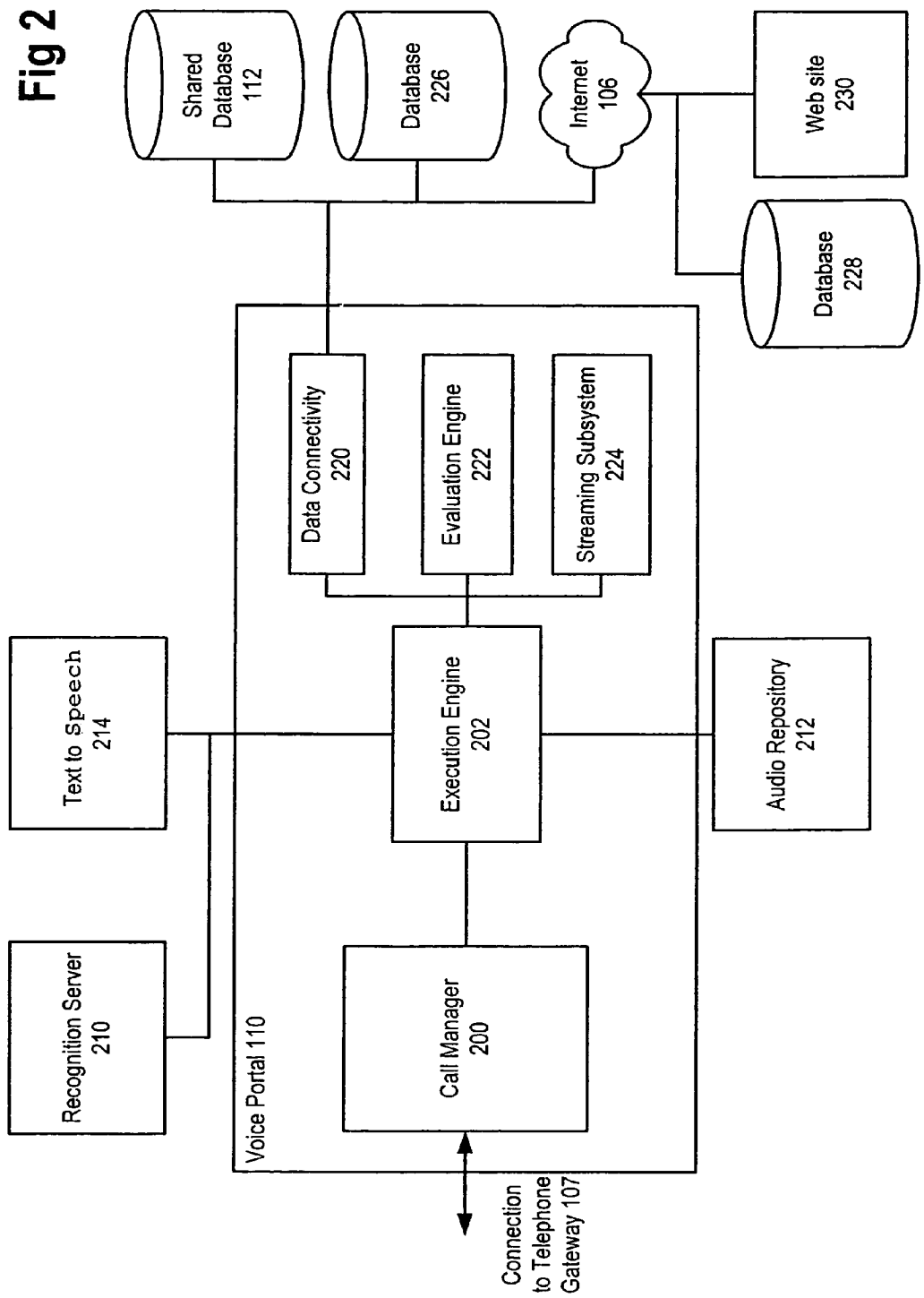
FIG. 2 illustrates the components of a voice portal supporting personalized content.

FIG. 2 illustrates the components of a voice portal supporting personalized content. This could be used to support the voice portal 110 and provide personal content as described above.

The following lists the elements of FIG. 2 and describes their interconnections. The voice portal 110 is coupled in communication with the telephone gateway 107. The voice portal 110 includes a call manager 200, an execution engine 202, a data connectivity engine 220, an evaluation engine 222 and a streaming subsystem 224. Additionally, FIG. 2 includes elements that may be included in the voice portal 110, or which may be separate from, but coupled to, the voice portal 110. Thus FIG. 2 also includes a recognition server 210, a text-to-speech server 214, an audio repository 212, the shared database 112, a database 226, the Internet 106, a database 228, and a web site 230. The call manager 200 within the voice portal 110 is coupled to the execution engine 202. The execution engine 202 is coupled to the recognition server 210, the text-to-speech server 214, the audio repository 212, data connectivity engine 220, the evaluation engine 222, and the streaming subsystem 224. The data connectivity engine 220 is coupled in communication with the shared database 112, the database 226, and the Internet 106. The Internet 106 is coupled in communication with database 228 and the web site 230.

The following describes each of the elements of FIG. 2 in greater detail. The use of each of the elements will be described further in conjunction with the sections describing the personalization features.

Typically, the voice portal 110 is implemented using one or more computers. The computers may be server computers such as UNIX workstations, personal computers and/or some other type of computers. Each of the components of the voice portal 110 may be implemented on a single computer, multiple computers and/or in a distributed fashion. Thus, each of the components of the voice portal 110 is a functional unit that may be divided over multiple computers and/or multiple processors. The voice portal 110 represents an example of a telephone interface subsystem. Different components may be included in a telephone interface subsystem. For example, a telephone interface subsystem may include one or more of the following components: the call manager 200, the execution engine, the data connectivity 220, the evaluation engine 222, the streaming subsystem 224, the audio repository 212, the text-to-speech 214 and/or the recognition engine 210.

The call manager 200 is responsible for scheduling call and process flow among the various components of the voice portal 110. The call manager 200 sequences access to the execution engine 202. Similarly, the execution engine 202 handles access to the recognition server 210, the text-to-speech server 214, the audio repository 212, the data connectivity engine 220, the evaluation engine 222 and the streaming subsystem 224.

The recognition server 210 supports voice, or speech, recognition. The recognition server 210 may use Nuance 6™ recognition software from Nuance Communications, Menlo Park, Calif., and/or some other speech recognition product. The execution engine 202 provides necessary grammars to the recognition server 210 to assist in the recognition process. A grammar is set of syntactical constraints that define the set of word and/or phrase utterances that can be recognized. The results from the recognition server 210 can then be used by the execution engine 202 to further direct the call session. Additionally, the recognition server 110 may support voice login using products such as Nuance Verifier™ and/or other voice login and verification products.

The text-to-speech server 214 supports the conversion of text to synthesized speech for transmission over the telephone gateway 107. For example, the execution engine 202 could request that the phrase, "The temperature in Palo Alto, Calif., is currently 58 degrees and rising" be spoken to a caller. That phrase would be translated to speech by the text-to-speech server 214 for playback over the telephone network on the telephone (e.g., the telephone 100). Additionally the text-to-speech server 214 may respond using a selected dialect and/or other voice character settings appropriate for the caller.

The audio repository 212 may include recorded sounds and/or voices. In some embodiments the audio repository 212 is coupled to one of the databases (e.g., the database 226, the database 228, and/or the shared database 112) for storage of audio files. Typically, the audio repository server 212 responds to requests from the execution engine 202 to play a specific sound or recording.

For example, the audio repository 212 may contain a standard voice greeting for callers to the voice portal 110, in which case the execution engine 202 could request play-back of that particular sound file. The selected sound file would then be delivered by the audio repository 212 through the call manager 200 and across the telephone gateway 107 to the caller on the telephone, e.g., the telephone 100. Additionally, the telephone gateway 107 may include digital signal processors ("DSPs") that support the generation of sounds and/or audio mixing.

The execution engine 202 supports the execution of multiple threads with each thread operating one or more applications for a particular call to the voice portal 110. Thus, for example, if the user has called in to the voice portal 110, a thread may be started to provide her/him a voice interface to the system and for accessing other options.

In some embodiments of the invention an extensible markup language ("XML")-style language is used to program applications. Each application is then written in the XML-style language and executed in a thread on the execution engine 202. In some embodiments, an XML-style language such as VoiceXML from the VoiceXML Forum, <http://www.voicexml.org/>, is extended for use by the execution engine 202 in the voice portal 110.

Additionally, the execution engine 202 may access the data connectivity engine 220 for access to databases and web sites (e.g., the shared database 112, the web site 230), the evaluation engine 222 for computing tasks and the streaming subsystem 224 for presentation of streaming media and audio. The streaming subsystem 224 may allow users of the voice portal 110 to access streaming audio content, or the audio portion of streaming video content, over the telephone interface. For example, a streaming media broadcast from ZDNet™ could be accessed by the streaming subsystem 224 for playback through the voice portal.

The data connectivity engine 220 supports access to a variety of databases including databases accessed across the Internet 106, e.g. the database 228, and also access to web sites over the Internet such as the web site 230. In some embodiments the data connectivity engine can access standard query language (SQL) databases, open database connectivity databases ("ODBC"), and/or other types of databases. The shared database 112 is represented separately from the other databases in FIG. 2; however, the shared database 112 may in fact be part of one of the other databases, e.g., the database 226. Thus, the shared database 112 is distinguished from other databases accessed by the voice portal 110 in that it contains user profile information.

Having described the hardware and software architecture supporting various embodiments of the invention, the various features provided by different embodiments of the invention will now be described.

In a first embodiment of the invention, a DTMF (i.e., touch tone) keypad input method is used as a backup interaction mode for navigating the voice portal. Such a mode can be useful in noisy environments where voice input is problematic. In other embodiments, the touch tone keypad input method may be implemented simply as a convenient alternative input method.

Figure 3:
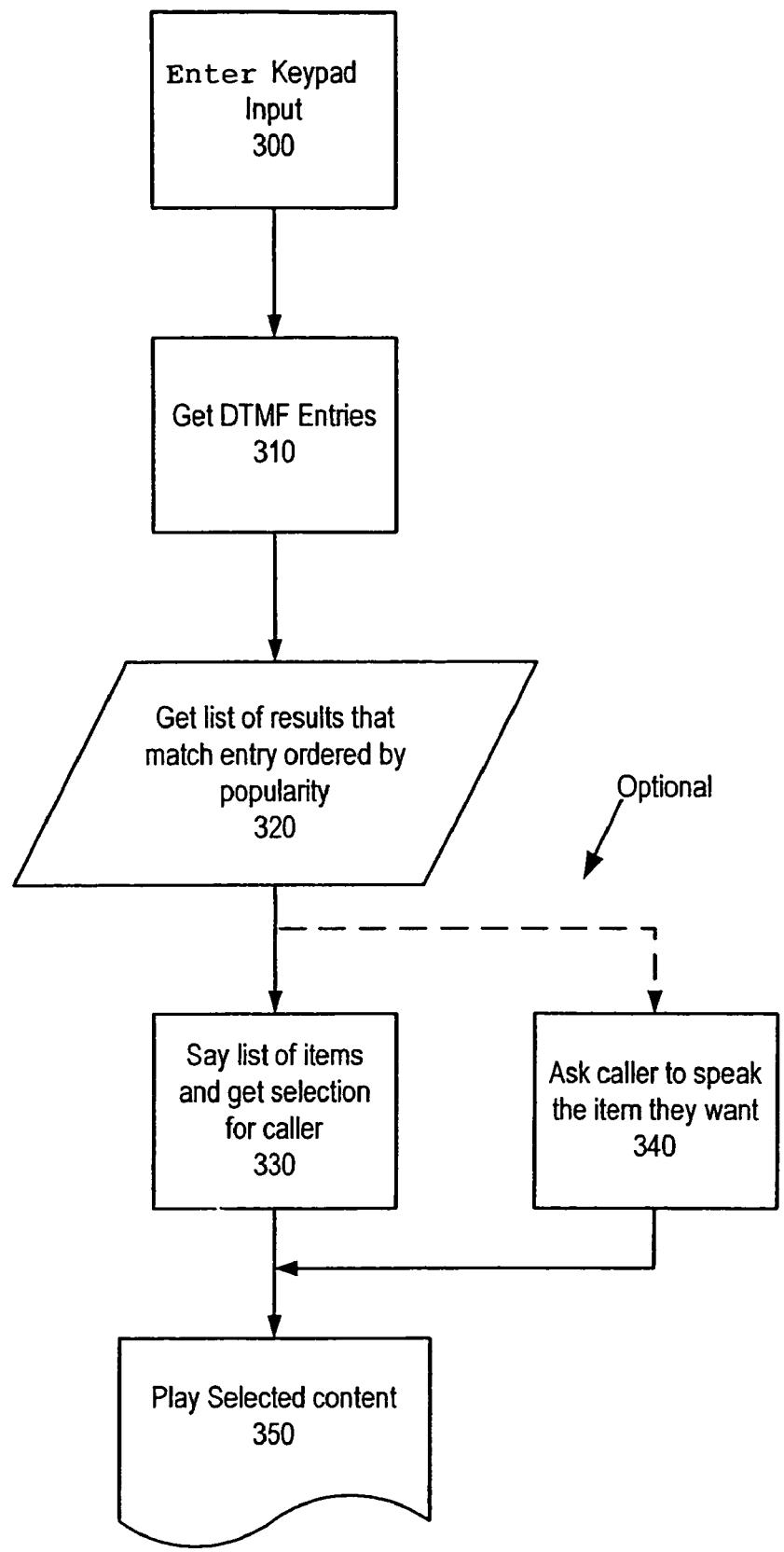
FIG. 3 is a process flow diagram supporting the method of entering and confirming input data entered via a keypad.

Turning to FIG. 3, the process of entering and responding to user keypad input is described. At step 300, the user inputs data via the telephone keypad using a single keystroke for each alphanumeric character. This step occurs after the user has initiated a call and connected to the voice portal 110. Thereafter, at step 310, the voice portal 110 receives the DTMF tones corresponding to the user keypad input. Next at step 320, the voice portal 110 compares the keypad input to the valid keyword list and gets a list of those valid keywords that have initial letters corresponding to the keypad input and sorts them by a weighting factor associated with each valid keyword, e.g., popularity or probability based upon historical access frequency. It should be noted that the keywords may also be sorted by any other weighting factor assigned to each keyword by the system operator.

Three different embodiments will now be considered, according to the first two embodiments, the process continues from step 320 to step 330. At step 330, the voice portal 110 verbally plays back the sorted list of keywords whereupon the user may either enter a numerical keypad response to select an item on the sorted list, or alternatively, the speaker may speak the number of the item on the sorted list, whereupon the voice portal 110 will at step 350 play back the response appropriate to the selected item over the telephone.

According to an alternative embodiment, at step 330, the voice portal is programmed to sequentially play back the responses associated with each of the items on the sorted list, or alternatively, the response associated with the first n items of the sorted list, where n is an integer that may be selected by the voice portal operator. This can be accomplished by repeatedly looping through step 350 from step 330 for each of the items to be played back.

An example user interaction with voice portal 110 in a preferred embodiment is as follows:
[VP] "Please enter the stock ticker symbol followed by a # sign."
[User] 6, 7, 3, 8, # (i.e., DTMF input corresponding to MSFT#)
[VP] "There are 3 companies that match that entry. To skip ahead, press 6. To go back, press 4."
[VP] "Microsoft Corporation, up $1\frac{3}{8}$ to $82\frac{5}{16}$. Magellan Petroleum, down $\frac{1}{16}$ to $1\frac{7}{32}$. Objectsoft up $\frac{1}{32}$ to $1\frac{11}{16}$. That's all the quotes. What's the next company?"

In yet another embodiment of the invention, after the voice portal gets the list of valid keywords at step 320 and then the process continues at step 340. The voice portal 110 context is set to a restricted grammar that recognizes only the keywords in the valid keyword list (and optionally, any other command or escape keywords that may be desired) and prompts the user to speak the name of the item desired. By using such a restricted grammar, voice recognition accuracy can be increased, and upon recognizing the spoken item, the voice portal can then play the response associated with the spoken item.

An example dialogue in an alternative embodiment is as follows:
[VP] "Please enter the stock ticker symbol followed by a # sign."
[User] 6, 7, 3, 8, # (i.e., DTMF input corresponding to MSFT#)
[VP] "There are 3 companies that match that entry. To select a company, please say the name of the company or enter the number of the company at any time. The first match is Microsoft Corporation. The second match is Magellan Petroleum. The third match is Objectsoft. That's all the matching companies."

[User] "Microsoft."

[VP] "Microsoft Corporation, up 1⅜ to 82⁵⁄₁₆. What's the next company?"

According to some embodiments, the list of matches is not played back during step 340 unless user input is not received after a pre-determined period. The restricted grammar can rank items by their likelihood of being chosen, thus in addition to being limited to the few valid choices, the speech recognition engine can be programmed to favor more commonly selected items.

The foregoing description of various embodiments of the invention has been presented for purposes of illustration and description. It is not intended to limit the invention to the precise forms disclosed. Many modifications and equivalent arrangements will be apparent to those skilled in the art.

What is claimed is:

1. A method in a voice response system of receiving input of a keyword, the method comprising:
   providing a list of keywords of characters;
   providing a list of words, each word having an output utterance that is an audio representation of the word, each word being associated with a keyword in the provided list of keywords, and each word having a different spelling from its associated keyword;
   receiving from a user a key sequence with a key of the key sequence representing multiple characters;
   identifying from the received key sequence without other input from the user those keywords of the list of keywords whose initial characters match the possible characters of the received key sequence;
   after identifying the keywords of the list that match,
      outputting an output utterance corresponding to the words associated with each identified keywords; and
      prompting the user to select an identified keyword by speaking the output utterance corresponding to the word associated with the keyword to be selected; and
   after outputting the output utterances, inputting from the user an input utterance corresponding to one of the output utterances; and
   recognizing the input utterance using a constrained recognition grammar that is constrained by the output utterances corresponding to the words associated with the identified keywords such that the input utterance can only be recognized as a word associated with one of the identified keywords.

2. The method of claim 1 wherein the key sequence is a dual tone multi-frequency key sequence.

3. The method of claim 1 wherein the utterances of the identified keywords are output in an order based on a weighting factor.

4. The method of claim 3 wherein the weighting factor is based on an expected likelihood of the utterance being selected by the user.

5. The method of claim 3 wherein the weighting factor is based on access frequency associated with the utterances.

6. The method of claim 1 wherein the key sequence is a dual tone multi-frequency key sequence, and wherein the utterances of the identified keywords are output in an order based on a weighting factor.

7. The method of claim 1 wherein the inputting from the user a selection of one of the utterances includes the user speaking the selected utterance.

8. The method of claim 1 wherein the inputting from the user a selection of one of the utterances includes the user speaking an alphanumeric character associated with an utterance.

9. The method of claim 1 wherein the inputting from the user a selection of one of the utterances includes receiving from the user a selection of a key corresponding to the utterance.

10. A computer-readable medium encoded with instructions for controlling a voice response system to receive input of a word, by a method comprising:
    providing a list of words, each word having an output utterance that is an audio representation of the word;
    providing a list of keywords of characters, each keyword associated with a word in the provided list of words and each keyword having a different spelling from its associated word;
    receiving from the user a key sequence with a key of the key sequence representing multiple characters, each key represented as a dual tone multi-frequency key;
    identifying from the received key sequence without other input from the user those keywords of the list whose initial characters match the possible characters of the received key sequence;
    after identifying the keywords of the list that match,
       outputting an output utterance corresponding to the word associated with the identified keywords in an order based on a weighting factor for the utterances; and
       prompting the user to select an identified keyword by speaking the output utterance corresponding to the word associated with the keyword to be selected; and
    after outputting the output utterances, inputting from the user an input utterance corresponding to one of the output utterances; and
    recognizing the input utterance using a constrained recognition grammar that is constrained by the output utterances corresponding to the words associated with the identified keywords such that the input utterance can only be recognized as a word associated with one of the identified keywords.

11. The computer-readable medium of claim 10 wherein the weighting factor is based on an expected likelihood of the utterance being selected by the user.

12. The computer-readable medium of claim 10 wherein the weighting factor is based on access frequency associated with the utterances.

13. The computer-readable medium of claim 10 wherein the inputting from the user a selection of one of the utterances includes the user speaking the selected utterance.

14. The computer-readable medium of claim 10 wherein the inputting from the user a selection of one of the utterances includes the user speaking an alphanumeric character associated with an utterance.

15. The computer-readable medium of claim 10 wherein the inputting from the user a selection of one of the utterances includes receiving from the user a selection of a key corresponding to the utterance.

16. A voice response system that receives input of a word from a user, comprising:
    a component that provides a list of words and an output utterance for each of the words;
    a component that provides a list of keywords of characters, each keyword associated with a word in the provided list of words and each keyword having a different spelling from its associated word;

a component that receives from a user a key sequence with a key of the key sequence representing multiple characters;

a component that identifies from the received key sequence without other input from the user those keywords of the list of keywords whose initial characters match the possible characters of the received key sequence;

a component that, after identifying the keywords of the list that match, outputs an output utterance corresponding to words associated with each of the identified keywords and prompts the user to select a word by speaking the output utterance corresponding to the word to be selected;

a component that, after outputting the output utterances, inputs from the user an input utterance corresponding one of the output utterances; and a component that recognizes the input utterance using a constrained recognition grammar that is constrained by the output utterances corresponding to the words associated with the identified keywords such that the input utterance can only be recognized as a word associated with one of the identified keywords.

17. The system of claim 16 wherein the utterances are output before the prompting.

18. The system of claim 16 wherein the utterances are output after the prompting.

* * * * *